Feb. 13, 1951

P. F. BOEHM 2,541,858

CURSOR WITH LOCK

Filed Sept. 26, 1947

Inventor
Paul F. Boehm
By Curtis, Morris & Safford
Attorneys

Patented Feb. 13, 1951

2,541,858

UNITED STATES PATENT OFFICE 2,541,858

CURSOR WITH LOCK

Paul F. Boehm, Greenwich, Conn.

Application September 26, 1947, Serial No. 776,307

2 Claims. (Cl. 235—70)

The present invention relates to cursors for use on slide rules and similar calculating instruments.

It is an object of the invention to provide a cursor with means permitting locking it in any desired position along a slide rule or the like so as to avoid mistakes and time losses that otherwise occur frequently in calculations due to accidental and unnoticed movements of the cursor.

It is another object of this invention to provide locking means that are simple to operate and inexpensive in manufacture.

Other objects of the invention will become apparent from the following description of a preferred embodiment of it, reference being had to the accompanying drawing in which like numerals in different figures refer to the same parts.

Similar reference characters refer to similar parts throughout the several views of the drawing.

When using a slide rule with a cursor of any type it is frequently desirable or necessary to set the cursor with its index at a certain numerical value on any one of the slide rule scales in order to make it possible to carry out further calculations by positioning the slide with respect to the index of the cursor. The movements of the slide during such continued calculations frequently cause the cursor to move out of its set position because of frictional engagement between the slide and the cursor or the fingers of the operator may hit the cursor accidentally and move it. If the movement of the cursor is noticed immediately by the operator, the cursor may be reset although this results in a very undesirable loss of time and the possibility that the cursor may be reset inaccurately. Quite often, however, the fact that the cursor has moved remains unnoticed through a series of calculations so that all the readings made after setting the cursor have to be repeated for the user cannot know at which stage of his series of calculations the cursor was accidentally moved.

Conventional cursors on slide rules are equipped with a spring that is intended to maintain a certain amount of friction between the cursor and the slide rule. However, the degree of friction created by these springs as a rule is kept low so that it does not interfere with smooth and easy movement of the cursor along the rule. Therefore, the friction produced by these springs is not sufficient to hold the cursor in a set position. It is accordingly another object of this invention to provide means for locking a cursor in any chosen position along the slide rule whenever desired.

Figure 2:
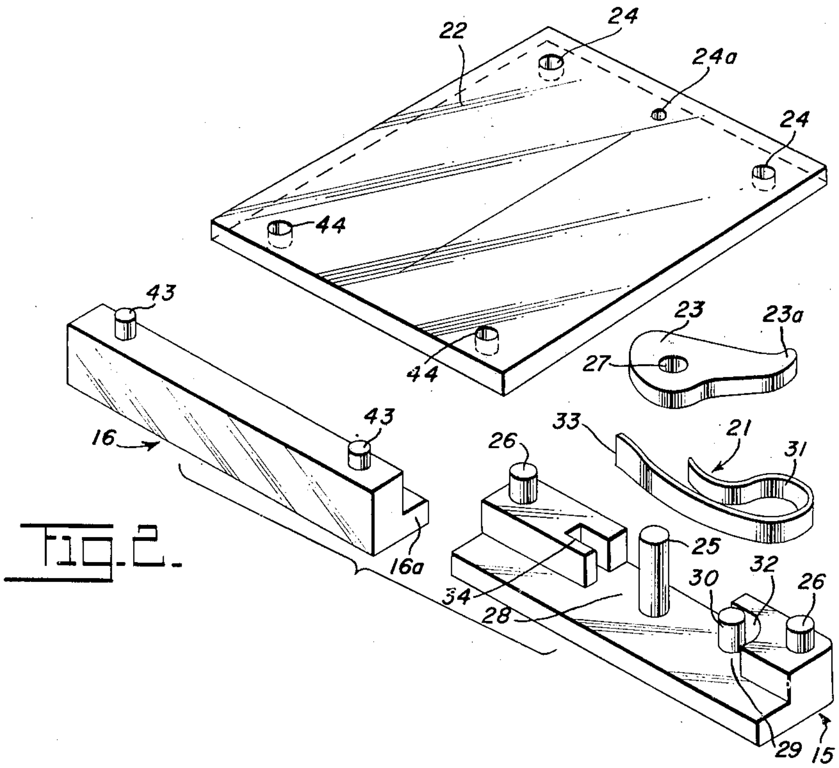
Figure 2 is an exploded perspective view of the cursor shown in Figure 1.
Figure 1:
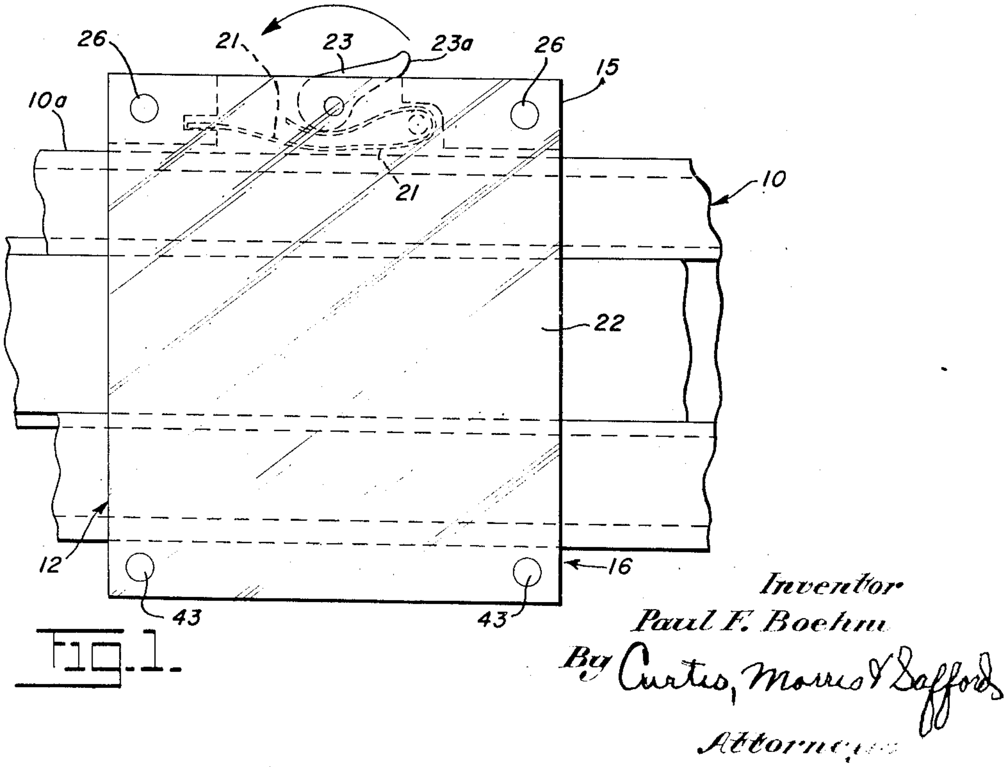
Figure 1 is a plan view of the cursor mounted on a slide rule.

In general, referring to Figures 1 and 2, a leaf spring 21 is mounted on the guide portion generally indicated at 15 of the cursor, generally indicated at 12, and having also a top plate 22 and a guide portion 16. Normally, a leaf spring 21 bears against the edge 10*a* of the slide rule, generally indicated at 10, with just enough pressure to maintain the cursor 12 correctly positioned on rule 10. The spring pressure is such that it permits the cursor to be easily and smoothly moved along the slide rule. Approximately in the center of portion 15 a cam 23 is pivotally mounted on cursor 12 so that in its unlocked position the low point of the cam is next to the spring 21, leaving the latter enough space to function freely as set forth. When the cam 23 is swung by means of its lever 23*a* into locked position, then the high point of the cam 23 bears against the spring 21 and presses it against the edge 10*a* of the rule 10 so that the cursor is solidly locked against movement with respect to the slide rule.

Specifically, referring to Figure 2, guide portion 15 of cursor 12 has a flange portion which extends beneath the edge of rule 10 and at the top portion 15 is provided with studs 26 which match in size and location to holes 24 in plate 22. Portion 15 is further provided near its center with a stud 25 that also matches with a hole 24*a* of plate 22. Stud 25 is surrounded by a cutout 28 extending transversely of portion 15 and of sufficient size to house the cam 23 when it is pivotally mounted on stud 25 by means of a hole 27.

At one end of cutout 28 there is a recess 29 in which a stud 30 is located. A narrow space 32 is left between stud 30 and the wall of recess 29 so that leaf spring 21 may be mounted on stud 30 with its looped end 31 around the stud. The main portion of spring 21 and its looped end 31 are positioned between cam 23 and the edge 10*a* of rule 10 and the free end 33 of spring 21 is fitted into a slot 34 at the other side of cutout 28. Thus the spring 21 is mounted so that it exerts slight frictional pressure against the rule's edge 10*a* when the cursor is mounted on the slide rule. Both ends of the spring 21 are mounted so that they cannot scratch the rule when the cursor is in use or catch on the end of the rule when the cursor is being mounted on it.

It can be seen that by thus mounting cam 23 and spring 21 on portion 15, the latter may be attached to plate 22 by inserting the ends of studs 25 and 26 into the corresponding holes 24 and 24*a* of the plate 22. The guide portion 16 is positioned on the opposite side of cursor 12 from portion 15 and includes a flange portion 16*a* which extends beneath the rule. Portion 16 is provided with studs 43 which fit into complementary holes 44 in plate 22.

Portions 15 and 16 are so constructed that they may be readily molded and plate 22 is made from plastic sheet stock. This permits portions 15 and 16 and plate 22 to be cemented together, in which case the provision of studs 25, 26 and 43, and holes 24, 24*a* and 44 eliminate even the necessity of fixtures for assuring correct relative position of these parts.

It is to be noted that the cursor described hereinabove has two definite advantages. First, because of the fact that the cam does not act directly on edge 10*a* of the slide rule but acts through the spring 21, the pressure on edge 10*a* is distributed over a comparatively larger area of the edge. This prevents wear or damage to the edge of the slide rule. Second, because the cam acts against the spring and not edge 10*a*, the swinging motion of the cam 23 while moving into clamping position will not move the cursor out of the position on the rule in which it was intended to be locked. This could happen if the cam acted directly against the rule edge 10*a*.

While I have shown and described a preferred embodiment of my invention I do not wish to be limited to the details and features illustrated and set forth, since many modifications and variations may be provided by people skilled in the art, without, however, departing from the basic idea and scope of this invention.

What is claimed is:

1. In a cursor for slide rules and similar devices, in combination, a cursor, a cam member mounted on said cursor, means for moving said cam member to a locking position, a pivot pivotally mounting said cam member on said cursor, a spring interposed between said cam member and said slide rule, said pivot and cam member being so positioned on said slide rule that when said cam member is pivoted to said locking position it exerts pressure on said spring and acts through said spring upon said slide rule to lock said cursor to said slide rule.

2. In a slide rule construction, the combination of, a cursor including a top plate and a pair of guide portions which snugly receive the side edges of a slide rule and guide the cursor therealong, and a mechanism mounted in one of said guide portions and comprising a leaf spring having a main portion which is bowed against the side edge of the slide rule and having a loop portion formed at one end of the main portion, said guide portion having a pin projected through said loop portion of the leaf spring and having a pivot pin positioned adjacent the center of the main portion of the leaf spring, and a cam member pivoted on said pivot pin and having a cam surface which is adapted to engage said leaf spring and urge the central part of said main portion against the adjacent edge surface of the slide rule with a locking engagement, said cam member having an operating arm projecting from the side of the cursor for manual operation of the cam member.

PAUL F. BOEHM.

REFERENCES CITED

The following references are of record in the file of this patent:

UNITED STATES PATENTS

| Number | Name | Date |
|---|---|---|
| 2,446,696 | Eckel | Aug. 10, 1948 |

FOREIGN PATENTS

| Number | Country | Date |
|---|---|---|
| 537,186 | France | Feb. 25, 1922 |

OTHER REFERENCES

Figure 1432, p. 161, of "The Engineer's Sketch-Book," by Thomas Walter Barber; published by E. and F. N. Spon, 57 Haymarket S. W., 1 London, England.